June 23, 1959  R. S. ZEBARTH  2,891,276
COMBINED CONVEYOR AND CLEANER FOR SMALL ARTICLES
Filed Oct. 29, 1956  2 Sheets—Sheet 2

INVENTOR.
Ralph S. Zebarth
BY
ATTORNEY.

United States Patent Office 2,891,276
Patented June 23, 1959

2,891,276

COMBINED CONVEYOR AND CLEANER FOR SMALL ARTICLES

Ralph S. Zebarth, Hickman Mills, Mo., assignor to Gordon Johnson Equipment Company, Kansas City, Mo., a corporation of Missouri Application October 29, 1956, Serial No. 619,057

2 Claims. (Cl. 17—11)

This invention relates to conveyor structure particularly adapted for use in a poultry processing plant in conjunction with an overhead conveyor and capable of handling small articles such as poultry parts.

More particularly, the instant invention relates to a trough for receiving poultry giblets and conveying the same to a suitable receptacle through use of jets of water directed longitudinally of the trough to force the giblets therealong.

It is the most important object of the present invention to combine in a water jet conveyor of the aforementioned character means for simultaneously cleaning the giblets and removing the water, together with foreign matter, from the trough prior to collection of the giblets in a suitable receptacle at one end of the trough.

Another important object of the instant invention is to provide a combined conveyor and cleaner for small articles that is especially adapted for use in connection with a water flushed eviscerating trough that underlies the overhead conveyor for the birds and which is provided with a lateral branch disposed to receive the said water and foreign matter from the overlying giblet receiving conveyor trough.

Another important object of the present invention is to provide in connection with a primary conveyor and cleaner, a transversely disposed vessel alongside the water flushed eviscerating trough and communicating with the primary giblet conveyor, thereby permitting a plurality of workers to remove parts from the birds and quickly dispose of the same with a minimum amount of labor and lost motion.

A still further object of the instant invention is to provide a conveyor that is specially formed at the bottom thereof with a plurality of slits, together with corresponding downturned lips struck therefrom to provide a minimum resistance to free movement of the small parts along the trough under influence of the water jets.

Other objects include important details of construction, all of which will be made clear or become apparent as the following specification progresses, reference being had to the accompanying drawings, wherein.

Figure 1:
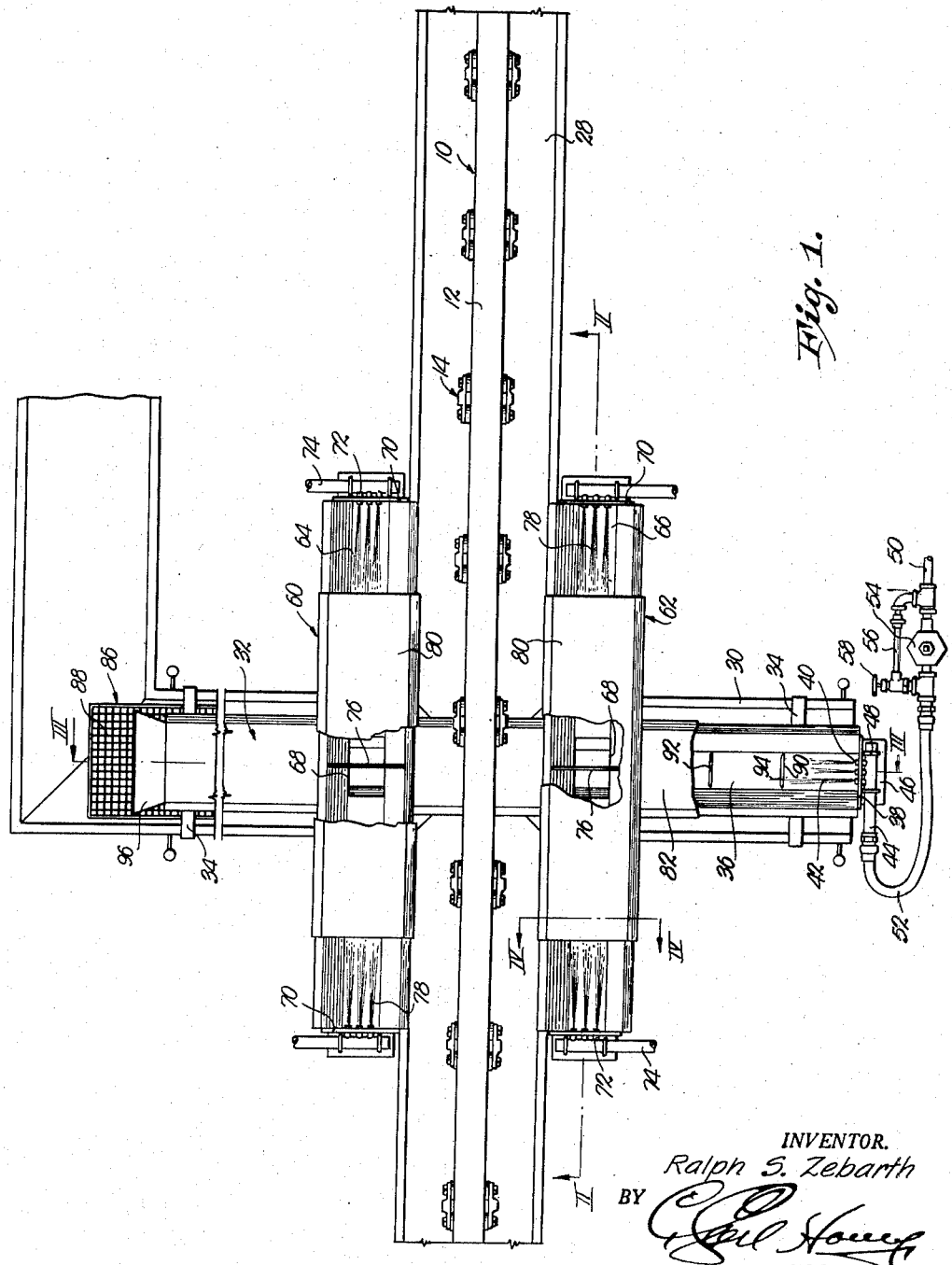
Figure 1 is a fragmentary, top plan view of a combined conveyor and cleaner for small articles made pursuant to the present invention.
Figure 2:
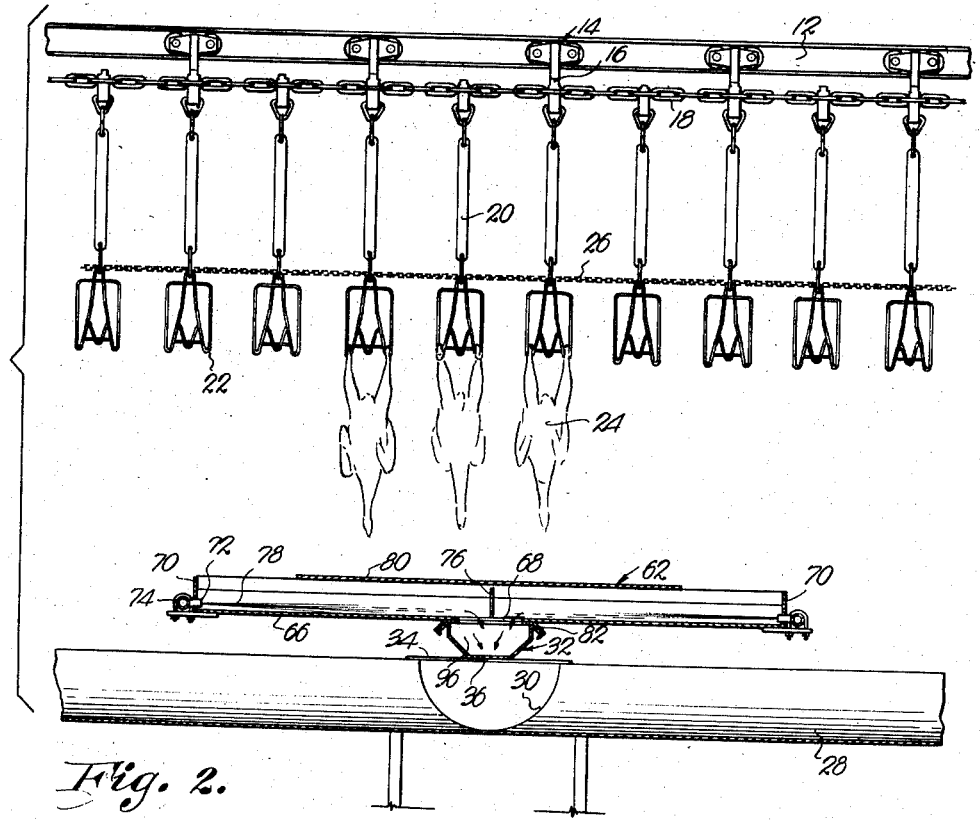
Fig. 2 is a fragmentary, side elevational view thereof, partially in section and taken on line II—II of Fig. 1.

Poultry processing plants are conventionally equipped with an overhead conveyor as seen in Figs. 1 and 2 of the drawings and broadly designated by the numeral 10. Conveyor 10 includes a track 12 supporting a plurality of spaced-apart, wheeled carriers 14 having shanks 16 depending therefrom and interconnected by a chain 18. The chain 18 and shanks 16 support a plurality of bars 20 which in turn receive shackles 22 that support the birds 24. Another chain 26 interconnects bars 20 at their points of connection with the shackles 22.

It is common practice to dispose the overhead conveyor 10 in overlying relationship to a water flushed eviscerating trough 28 and in accordance with the present invention, the trough 28 is in turn provided with a lateral branch 30 which ultimately terminates at a point of waste disposal (not shown).

In view of the particular use to which the instant invention has been especially adapted, the branch 30 of trough 28 is within the eviscerating area of the poultry processing plant and, more particularly, at the zone of giblet removal. Accordingly, there is illustrated in the drawings an elongated vessel 32 substantially coextensive in length with the branch 30 and supported in overlying relationship thereto by suitable transverse arms or brackets 34, welded or otherwise attached directly to bottom 36 of the vessel 32.

Figure 3:
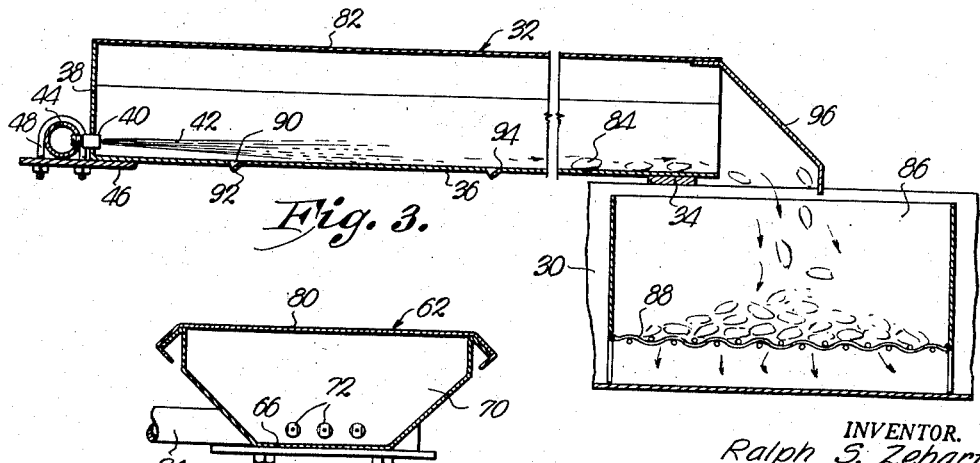
Fig. 3 is a fragmentary, cross-sectional view taken on line III—III of Fig. 1.
Figure 4:
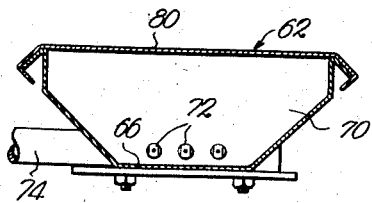
Fig. 4 is a fragmentary, detailed cross-sectional view taken on line IV—IV of Fig. 1 on an enlarged scale.

The vessel 32 is in the nature of a trough which may have the transverse configuration shown in Fig. 2 of the drawings and, in addition to the bottom 36, is provided with an upright wall 38 closing one end thereof. Wall 38 supports a plurality of nozzles 40 disposed to direct jets of water 42 longitudinally of the vessel 32 to the opposite end of vessel 32 in a manner best illustrated by Fig. 3 of the drawings.

The nozzles 40 are connected to a manifold 44 that is in turn attached to the vessel 32 by a plate 46 mounted on the bottom 36 and by clamps 48 which rigidly secure the manifold 44 to the plate 46.

Water suply line 50 is coupled with the manifold 44 by a hose 52 or the like, and has a pressure regulator 54 interposed therein. A pipe 56 bypasses the pressure regulator 54 and is provided with a quickly releasable valve 58.

In addition to the primary conveyor 32 there is provided a pair of secondary combined conveyors and cleaners 60 and 62, one on each side respectively of the trough 28 in overlying transverse relationship to the vessel 32. The receptacles 60 and 62 are substantially identical with the vessel 32 in that the same are in the nature of elongated, trough-like receptacles provided with bottoms 64 and 66 respectively. Bottoms 64 and 66 of troughs 60 and 62 are imperforate except for an intermediate outlet 68 communicating directly with the trough 32.

Both ends of the two receptacles 60 and 62 are closed by walls 70 through which project a plurality of nozzles 72 forming a part of manifolds 74 and preferably provided with the same type of pressure regulator, bypass and valve arrangement, as shown in Fig. 1 for the manifold 44.

Inasmuch as the nozzles 72 are disposed to direct water jets in opposite directions longitudinally of the receptacles 60 and 62, there is provided a baffle 76 transversely of each trough 60–62 respectively, midway of the ends of the elongated outlets 68 and thereabove for preventing the water jets 78 from operating in opposition at the outlets 68.

It is to be preferred that the troughs 60 and 62 be provided with covers 80 extending throughout the lengths thereof except at their ends in the manner shown in Figs. 1 and 2, and that the primary trough 32 likewise be provided with a cover 82 open only at the outlets 68 in bottom walls 64 and 66.

The above arrangement accommodates four operators, one at each end respectively of each trough 60 and 62. Such operators remove the giblets from the viscera of the birds 24 as the latter are advanced continuously by the conveyor 10. The operators clean and wash the giblets prior to placing the same into the troughs 60 and 62 and in the case of the gizzards, the cleaning and washing is preceded by slitting the gizzards open and removing the lining prior to washing the meat. These operations which precede placing of the giblets into the troughs 60 and 62 are accomplished through use of a basin and waterflow system (not shown) communicating with the trough 28 at each end respectively of each of the troughs 60 and 62.

As soon as the giblets are placed in the troughs 60 and 62 they are conveyed by the force of the jets of water 78 along the troughs 60 and 62 to the outlet 68 for discharge into the underlying trough 32. The jets of water 78 not only serve the function of conveying the giblets to the trough 32 but simultaneously cleanse such giblets and the water 78, as well as the foreign matter removed from the giblets, all pass through the outlets 68 into the trough 32.

The jets of water 42 operate in a similar manner to convey the giblets 84 (Fig. 3) along the trough 32 for discharge into a suitable receiver 86 disposed within the branch 30 of trough 28 and preferably provided with a foraminous bottom 88 for drainage from the giblets 84 into the branch 30 of any water that may be discharged from the trough 32 through the open end of the latter. It is contemplated, however, that substantially all of the water 78 and 42 will be discharged into the branch 30 of the trough 28 from the trough 32 prior to reaching the outlet end of the trough 32 by virtue of the provision of a plurality of spaced, transverse slits 90 in the bottom 36 of trough 32. When the slits 90 are formed in the bottom 36 a downwardly and rearwardly flared lip 92 is stamped therein, presenting a smooth arcuate edge 94 across which the giblets 84 are moved under the force of the water jets 42. Accordingly, substantially all of the water and foreign matter washed from the giblets 84 by the streams 78 and 42 are discharged to the underlying trough branch 30 through the slits 90 and any water that does flow into the receiver 86 is substantially clean. The provision of the lips 92 in conjunction with the forming of the openings 90 in the bottom 36 of trough 32 eliminates the presentation of abutments or obstacles to the free sliding movement of the giblets 84 along the bottom 36 longitudinally thereof. Inasmuch as the giblets 84 are moved with considerable force by the pressure of the jet streams 42, it is desirable to provide a deflector 96 at the discharge end of the trough 32 for guiding the giblets 84 into the receiver 86 and operating in much the same manner as the baffles 76 which direct the water 78 and the giblets 84 through the outlets 68 into the trough 32 as seen in Fig. 2.

While in the drawings the bottoms 36, 64 and 66 of troughs 32, 60 and 62 respectively are shown horizontally disposed, it has been found that the same may incline in either direction, making it necessary to merely adjust the pressure regulators 54 to assure sufficient pressure in the streams 42 and 78 to carry the giblets 84 along the respective troughs. So far as the jet streams 42 are concerned, it is desired as above indicated that the force be sufficient only to carry the giblets 84 to the discharge end of the trough 32 without an appreciable amount of the water 42 and the water 78 flowing into the receiver 86.

The arrangement illustrated in the drawings and above described has been designed primarily for handling gizzards. It is to be preferred, however, that a double trough arrangement be provided for hearts and livers. In other words, at the station wherein operators remove hearts and livers from the birds 24, the receptacles 60 and 62 are each in the nature of a pair of side-by-side troughs, one for receiving the hearts and the other for receiving the livers. Similarly, the primary trough 32 is divided into a pair of side-by-side passages for receiving the hearts and the livers.

The provision of the pressure regulator 54 is to permit adjustment of the force of the jet streams as above indicated and the bypass 56, as well as the quick release valve 58, is for the purpose of preventing any slowdown in operation by virtue of the small parts piling up in any one of the troughs. In that event it is but necessary for the operator to release the valve 58, thereby increasing the pressure of the corresponding water jets and as soon as the "pile up" has been removed, the valve 58 is immediately closed.

Having thus described the invention what is claimed as new and desired to be secured by Letters Patent is:

1. A combination conveyor and cleaner for edible poultry parts comprising, an elongated trough-like vessel having a bottom, one open end and a wall closing the other end; a nozzle carried by said wall disposed to direct a liquid jet longitudinally of the vessel to force said parts along said bottom toward said open end; said bottom formed with a plurality of longitudinally spaced transversely extending slits for draining liquid and foreign matter from the trough, and a lip at each slit extending downwardly and rearwardly from said bottom toward said other end providing a smooth arcuate edge along said slit; a container having a foraminous bottom disposed beneath the open end of said vessel for receiving and draining said parts; and a deflector at the open end of said vessel for directing the parts into said container as they emanate from said open end of said vessel.

2. A combination conveyor and cleaner for edible poultry parts as in claim 1 and including a trough beneath and coextensive with said vessel, and hydraulic conveying means for depositing said parts in said vessel.

References Cited in the file of this patent
UNITED STATES PATENTS

| | | |
|---|---|---|
| 1,294,455 | Hardy | Feb. 18, 1919 |
| 1,617,484 | Holt | Feb. 15, 1927 |
| 1,876,676 | Hill | Sept. 13, 1932 |
| 1,900,255 | Ormsbee | Mar. 7, 1933 |
| 2,262,767 | Jeter | Nov. 18, 1941 |
| 2,469,825 | Hornstein | May 10, 1949 |